US007837235B2

(12) United States Patent
Geser et al.

(10) Patent No.: US 7,837,235 B2
(45) Date of Patent: Nov. 23, 2010

(54) DEVICE FOR CLAMPING A FLUIDIC COMPONENT

(75) Inventors: Johannes Geser, Ingelheim (DE); Matthias Hausmann, Dortmund (DE)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 1161 days.

(21) Appl. No.: 11/031,171

(22) Filed: Jan. 7, 2005

(65) Prior Publication Data

US 2005/0194472 A1 Sep. 8, 2005

(30) Foreign Application Priority Data

Jan. 8, 2004 (DE) ....................... 10 2004 001 451

(51) Int. Cl.
*F16L 25/00* (2006.01)

(52) U.S. Cl. .................... 285/332.2; 285/249; 285/331; 285/334.3; 285/382.5

(58) Field of Classification Search ................. 285/249, 285/332, 332.1–332.4, 334.1, 334.3, 382.4, 285/382.5, 331
See application file for complete search history.

(56) References Cited

U.S. PATENT DOCUMENTS

| | | | | |
|---|---|---|---|---|
| 1,181,060 | A * | 4/1916 | Bennett | 277/625 |
| 2,278,479 | A * | 4/1942 | Parker | 285/54 |
| 2,331,020 | A * | 10/1943 | Frances | 285/295.2 |
| 2,669,465 | A * | 2/1954 | Newell | 285/53 |
| 3,249,372 | A * | 5/1966 | Pollack | 285/332.3 |
| 3,747,960 | A * | 7/1973 | Bawa | 285/39 |
| 3,757,960 | A | 9/1973 | Hill et al. | |
| 3,997,111 | A | 12/1976 | Thomas et al. | |
| 4,073,157 | A * | 2/1978 | Aylmer et al. | 405/170 |
| 4,150,794 | A | 4/1979 | Higgins | |
| 4,244,521 | A | 1/1981 | Guse | |
| 4,313,570 | A | 2/1982 | Olsen | |
| 5,033,681 | A | 7/1991 | Munoz | |
| 5,497,944 | A | 3/1996 | Weston et al. | |
| 5,848,753 | A | 12/1998 | Wands et al. | |
| 5,964,416 | A | 10/1999 | Jaeger et al. | |
| 6,176,442 | B1 | 1/2001 | Eicher | |
| 6,223,933 | B1 | 5/2001 | Hochrainer et al. | |

(Continued)

FOREIGN PATENT DOCUMENTS

CA 2291737 A1 12/1998

(Continued)

OTHER PUBLICATIONS

International Search Report for PCT/EP2004/014764 mailed Apr. 15, 2004.

*Primary Examiner*—Aaron Dunwoody
*Assistant Examiner*—Fannie Kee
(74) *Attorney, Agent, or Firm*—Michael P. Morris; David L. Kershner

(57) ABSTRACT

A fluidic component is arranged in an elastomeric shaped part, the contour of which is matched to the outer contour of the component and to the inner contour of a holder. The elastomeric shaped part is chamfered towards the fluidic component on its pressure side. When the holder is assembled, the elastomeric shaped part is deformed by a projection provided on a mating part and is put under uniformly distributed internal tension, after which the elastomeric shaped part surrounds the fluidic component to its full height.

9 Claims, 4 Drawing Sheets

U.S. PATENT DOCUMENTS

Figures 3A, 3B, 4A, 4B, 5A, 5B:
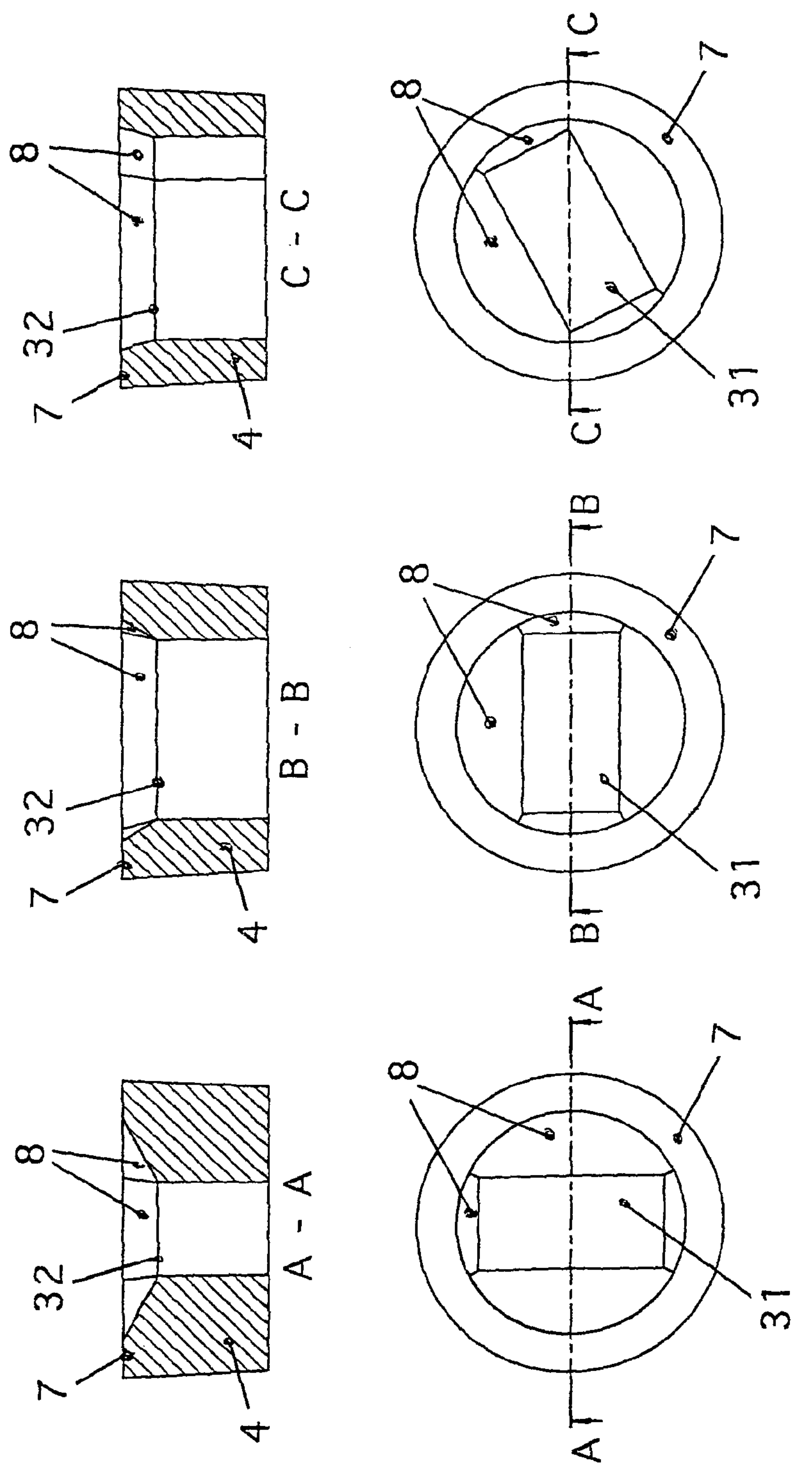

| | | | |
|---|---|---|---|
| 6,481,435 | B2 | 11/2002 | Hochrainer et al. |
| 6,491,897 | B1 | 12/2002 | Freund |
| 6,685,691 | B1 | 2/2004 | Freund et al. |
| 6,846,413 | B1 | 1/2005 | Kadel et al. |
| 6,977,042 | B2 | 12/2005 | Kadel et al. |
| 6,986,346 | B2 | 1/2006 | Hochrainer et al. |
| 7,040,311 | B2 | 5/2006 | Hochrainer et al. |
| 7,090,093 | B2 | 8/2006 | Hochrainer et al. |
| 7,314,187 | B2 | 1/2008 | Hochrainer |
| 2001/0008632 | A1 | 7/2001 | Freund et al. |
| 2001/0032642 | A1 | 10/2001 | Bach et al. |
| 2002/0007155 | A1 | 1/2002 | Freund et al. |
| 2003/0064032 | A1 | 4/2003 | Lamche et al. |
| 2003/0066524 | A1 | 4/2003 | Hochrainer et al. |
| 2004/0010239 | A1 | 1/2004 | Hochrainer |
| 2004/0143235 | A1 | 7/2004 | Freund et al. |
| 2004/0159319 | A1 | 8/2004 | Kadel et al. |
| 2004/0182867 | A1 | 9/2004 | Hochrainer et al. |
| 2005/0001076 | A1 | 1/2005 | Eicher et al. |
| 2005/0032494 | A1 | 2/2005 | Swant |
| 2005/0159441 | A1 | 7/2005 | Hochrainer et al. |
| 2005/0263618 | A1 | 12/2005 | Spallek et al. |
| 2006/0196500 | A1 | 9/2006 | Hochrainer et al. |
| 2006/0239930 | A1 | 10/2006 | Lamche et al. |
| 2006/0258993 | A1 | 11/2006 | Hochrainer et al. |
| 2006/0285987 | A1 | 12/2006 | Jaeger et al. |
| 2009/0114215 | A1 | 5/2009 | Boeck et al. |
| 2009/0185983 | A1 | 7/2009 | Freund et al. |

FOREIGN PATENT DOCUMENTS

| | | | |
|---|---|---|---|
| CA | 2404360 | A1 | 9/2001 |
| CA | 2653183 | A1 | 12/2007 |
| CA | 2653422 | A1 | 12/2007 |
| DE | 4115131 | A1 | 11/1991 |
| DE | 19722338 | A1 | 12/1998 |
| EP | 0046664 | | 3/1982 |
| WO | 9114468 | | 10/1991 |
| WO | WO 94/07607 | | 4/1994 |
| WO | 9701329 | | 1/1997 |
| WO | 9712683 | | 4/1997 |
| WO | 9712687 | | 4/1997 |
| WO | 9827959 | | 7/1998 |
| WO | 9916530 | | 4/1999 |
| WO | 0164268 | | 9/2001 |
| WO | 03002045 | | 1/2003 |
| WO | 2005065836 | A1 | 7/2005 |
| WO | 2007141201 | A1 | 12/2007 |
| WO | 2007141203 | A1 | 12/2007 |

* cited by examiner

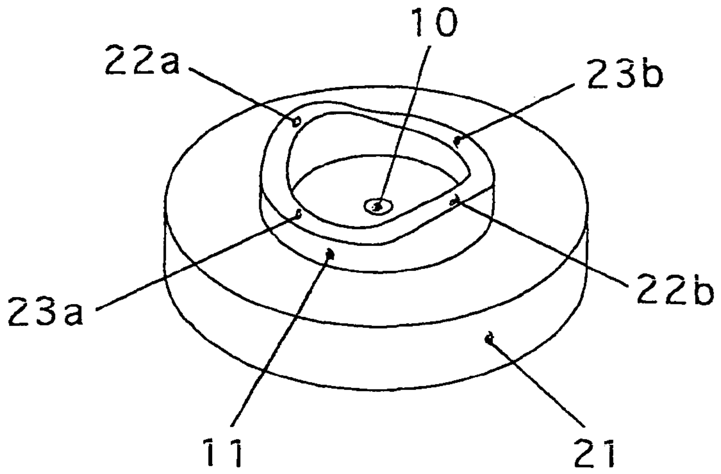
Fig. 2
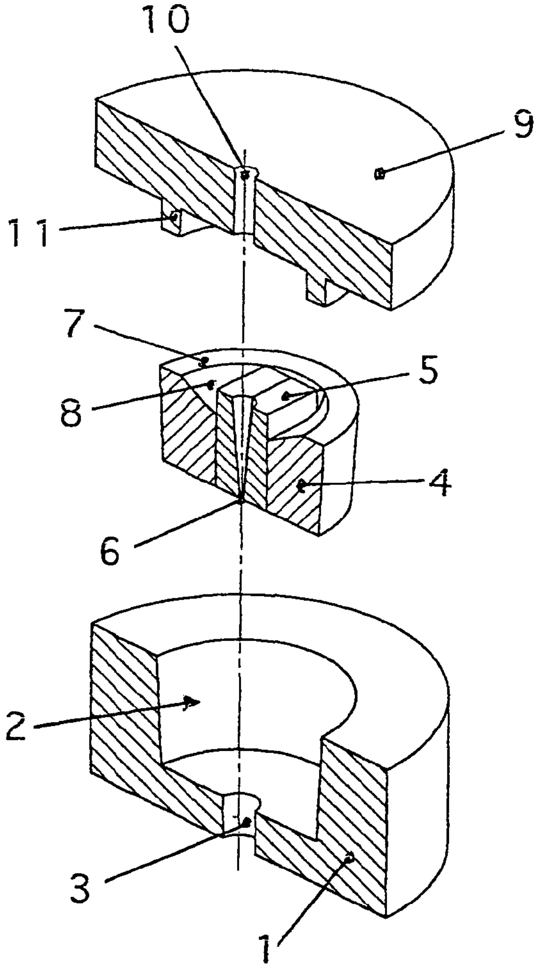
Fig. 1c
Fig. 1b
Fig. 1a

DEVICE FOR CLAMPING A FLUIDIC COMPONENT

BACKGROUND OF THE INVENTION

1. Field of the Invention

The invention relates to a device for clamping a fluidic component, particularly a nozzle, particularly in the high pressure region. Of particular interest are holders for micro-engineered components, particularly micro-engineered nozzles which are to be produced by micro-engineering. Such nozzles are used for example in nebulizers for producing propellant-free medicinal aerosols used for inhalation.

The aim of the invention is to further improve the clamping of a fluidic component consisting of a wear-resistant, hard, and generally brittle material, and to increase the reliability of the holder.

2. Brief Description of the Prior Art

Micro-engineered nozzles having for example a nozzle aperture of less than 10 μm are described for example in WO 94/07607 and WO 99/16530. The inhalable droplets produced thereby have a mean diameter of about 5 μm, when the pressure of the liquid to be nebulized is from 5 MPa (50 bar) to 40 MPa (400 bar). The nozzles may for example be made from thin sheets of silicon and glass. The external dimensions of the nozzles are in the millimeter range. A typical nozzle consists for example of a cuboid with sides measuring 1.1 mm, 1.5 mm and 2.0 mm, made up of two sheets. Nebulizers for producing propellant-free aerosols in which the device according to the invention for clamping a fluidic component can be used are known from WO 91/14468 or WO 97/12687.

The term fluidic component denotes a component which is exposed to a pressurized fluid, and the pressure is also present inside the component, for example in a nozzle bore. Such a component may be kept pressure-tight for example by pressing into a holder of hard material if the material of the component can withstand mechanical forces without collapsing or deforming to an unacceptable degree. At high pressures, seals of deformable material, e.g. copper, or hard material which can be pressed in with great force are used. In the case of components made of brittle material the known processes for pressure-tight clamping of the component require considerable effort and great care. It is impossible to predict with any reliability the service life of a fluidic component clamped in this way.

U.S. Pat. No. 3,997,111 describes a fluid jet cutting device with which a high-speed fluid jet is produced which is used for cutting, drilling or machining material. The nozzle body is cylindrical and consists e.g. of sapphire or corundum. The setting ring is pressed into an annular recess in the nozzle carrier and seals off the nozzle body against the nozzle carrier.

U.S. Pat. No. 4,313,570 describes a nozzle holder for a water jet cutting device wherein the nozzle body is surrounded by a ring of elastomeric material which is in turn mounted in a recess in the holder. The recess is in the form of a straight cylinder. The cross-section of the ring is rectangular. The outer surface of the recess and the outer and inner surfaces of the ring are arranged concentrically to the axis of the nozzle body and run parallel to one another and to the axis of the nozzle body.

WO 97/12683 discloses a device for clamping a fluidic component which is subjected to fluid pressure, which is suitable for components consisting of a wear-resistant, hard and hence generally brittle material, and which does not produce any excessively great local material tensions in the component. The fluidic component is arranged in a holder which makes contact with the fluidic component on its low pressure side. The fluidic component is surrounded by an elastomeric shaped part the outer contour of which is adapted to the inner contour of the holder and the inner contour of which is adapted to the outer contour of the fluidic component. The elastomeric component surrounds the entire circumference of the fluidic component. At least one free surface of the elastomeric component is exposed to the pressurized fluid. The holder may have a projection on the inside underneath which the elastomeric shaped part is pushed. It has proved difficult to generate internal tension in the elastomeric shaped part which is sufficiently great, even at low fluid pressures, and which is spatially roughly uniformly distributed in the elastomeric shaped part.

This known device has proved pressure-tight when subjected substantially constantly to moderate and high fluid pressures. When subjected to alternating fluid pressures fluctuating between a high peak value and a very low value, the known device is in need of improvement for long-term use.

The problem thus arises of providing a device for clamping a fluidic component which is reliably leak-tight even when subjected to alternating loading from a sharply fluctuating fluid pressure in long-term use. The components needed should be cheap to manufacture and should also be capable of being assembled with relative ease.

BREIF DESCRIPTION OF THE DRAWINGS

FIG. 1*a* is a cross-sectional, elevational view of a pot-shaped holder (1).

FIG. 1*b* is a cross-sectional, elevational view of an elastomeric shaped part (4) and a cuboid, fluidic component (5).

FIG. 1*c* is a cross-sectional, elevational view of a mating part (9) with a bore (10) and an annular projection (11).

FIG. 2 is an elevational view of the underside of the mating part (9).

FIGS. 3*a*, 4*a*, and 5*a* show the elastomeric shaped part viewed perpendicularly.

FIGS. 3*b*, 4*b*, and 5*b* are cross-sections through the elastomeric shaped part.

Figure 7C:
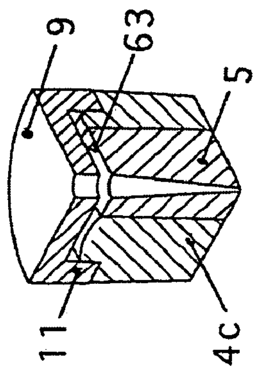
Figure 7B:
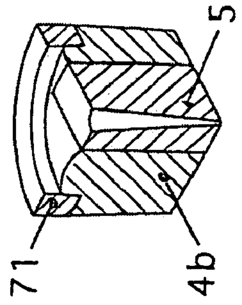
Figure 7A:
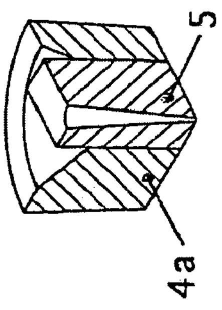

FIGS. 7*a*, 7*b*, and 7*c* show the holder according to the invention in cross-hatched cross-section.

Figure 8C:
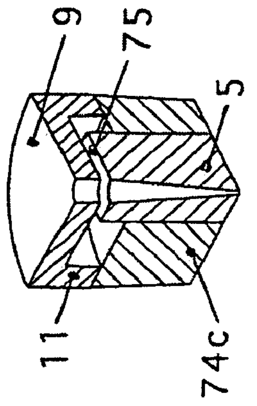
Fig. 8c Prior Art
Figure 8B:
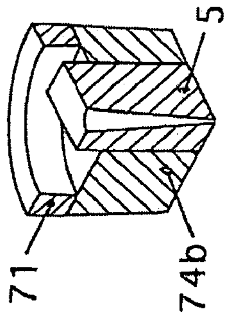
Fig. 8b Prior Art
Figure 8A:
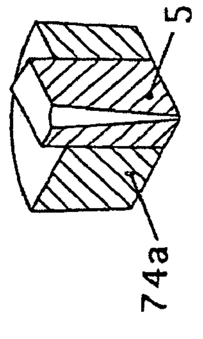
Fig. 8a Prior Art

FIGS. 8*a*, 8*b*, and 8*c* show a prior-art embodiment.

SUMMARY OF THE INVENTION

This problem is solved according to the invention by a device for clamping a fluidic component which is subjected to alternating fluid pressure and which comprises a holder within which the fluidic component is arranged. The holder makes contact with the fluidic component at its low pressure end. The device comprises an elastomeric shaped part which surrounds the fluidic component over its entire circumference. The outer contour of the elastomeric shaped part is adapted to the inner contour of the holder and the inner contour of the elastomeric shaped part is adapted to the outer contour of the fluidic component. The elastomeric shaped part has at least one free surface which is exposed to the pressurised fluid. The holder is secured at the high pressure end to a mating part, and

- before the assembly of the device the elastomeric shaped part is chamfered towards the fluidic component on its side facing the fluid pressure, and
- the mating part is provided with an annular projection the outer contour of which is adapted to the inner contour of the holder; after the assembly of the holder with the mating part the projection projects into the holder and deforms the elastomeric shaped part, as a result of which a uniformly distributed internal tension is generated in the elastomeric shaped part, and the volume of the projection on the mating part is adapted to the volume that is missing from the elastomeric shaped part in the region of the chamfer, and the elastomeric shaped part which is deformed and subjected to internal tension after the assembly of the holder with the mating part almost totally fills the space up to the mating part.

The elastomeric shaped part is chamfered into a recess at its high pressure end. The chamfer begins in the outer surface of the high pressure end of the elastomeric shaped part at a solid line which may be, for example, circular, elliptical, or rectangular. The chamfer may, for example, have a constant angle of inclination, or the angle of inclination may vary in the azimuthal direction. In the latter case, it is preferably smaller along the longer side of a cuboid, fluidic component than along the shorter side of the cuboid, fluidic component. The line of intersection of the chamfer with the recess in the elastomeric shaped part may extend at a constant level, or the line of intersection may be curved.

The projection on the mating part may preferably be annular and of constant width. The outer contour of the projection is preferably adapted to the inner contour of the holder. Moreover, the inner contour of the projection may be adapted to the outer contour of the fluidic component. The projection on the mating part may have a constant width and have a constant height on its circumference, or the projection may vary in width and/or height; it may, for example, be higher in the two areas located opposite the two longer sides of a cuboid, fluidic component than in the two areas located opposite the two shorter sides of a cuboid, fluidic component. In this way, the elastomeric shaped part may deform to different degrees in some areas when the holder and mating part are put together and influence the spatial distribution of the internal tension in the elastomeric shaped part. The internal tension in the elastomeric shaped part is produced substantially by the deformation of the elastomeric shaped part, not by its compression. The deformation of the elastomeric shaped part and the distribution of the tension in the elastomeric shaped part can be determined by the finite elements method (FEM).

The elastomeric shaped part is preferably constructed as an injection-molded part. The pre-elastomer is poured without bubbles into a mould that is adapted to the contours of the holder and the fluidic component. An elastomeric shaped part of this kind behaves somewhat like an incompressible fluid. It fits precisely into the holder and fluidic component. The elastomeric shaped part is only exposed to fluid pressure at the pressure end, not at the sides where it abuts on the holder and on the fluidic component. The elastomeric shaped part allows pressure compensation on the fluidic component. The elastomeric shaped part has no free surface towards the low pressure side. The elastomeric shaped part may consist, for example, of natural rubber or synthetic rubber, such as silicon rubber, polyurethane, ethene-propene rubber (EPDM), fluorine rubber (FKM) or nitrile-butadiene rubber (NBR) or of a corresponding rubber.

The fluidic component may consist of a wear-resistant, hard and hence generally brittle material (such as silicon, glass, ceramics, gemstone, e.g., sapphire, ruby, diamond) or of a ductile material with a wear-resistant hard surface (such as plastics, chemically metallized plastics, copper, hard chromium-plated copper, brass, aluminum, steel, steel with a hardened surface, wear-resistant surfaces produced by physical vapor deposition (PVD) or chemical vapor deposition (CVD), for example, titanium nitride (TiN) or polycrystalline diamond on metal and/or plastics. The fluidic component may be made in one piece or composed of a number of pieces, while the pieces may consist of different materials. The fluidic component may contain cavities, voids or channel structures. In the voids there may be microstructures which act as filters or anti-evaporation means, for example. The channels may be nozzle channels for an atomizer nozzle. An atomizer nozzle may contain one or more nozzle channels the axes of which may extend parallel to one another or be inclined relative to one another. If, for example, there are two nozzle channels the axes of which are located in one plane and which intersect outside the nozzle, the two fluid jets that emerge meet at the point of intersection of the axes and the fluid is atomized.

The holder may consist of virtually any desired material, preferably metal or plastics, and may be a body of revolution or a body of any other shape. The holder may, for example, be a pot-shaped body of revolution which contains a rotationally symmetrical recess, starting from its lid end, the axis of which coincides with the axis of the body of revolution. This recess may be cylindrical or in the shape of a truncated cone, the end of the truncated cone with the larger diameter being located at the lid end of the holder. The outer surface of the recess forms the inner contour of the holder. It may be produced as a molding, as a casting or by processing to remove material (e.g., by machining, etching, erosion, elision).

The mating part may consist of metal or plastics.

The holder which contains the elastomeric molding and the fluidic component is assembled with the mating part. The side of the elastomeric shaped part which contains the chamfer faces towards the mating part. The edge of the holder rests on the mating part. The fluidic component may be pushed into the elastomeric shaped part, preferably before the elastomeric shaped part is inserted in the recess in the holder. The holder may be attached to the mating part by screwing, gluing, welding, crimping, casting or press-fitting or snap-fitting onto the mating part. The holder may preferably be secured to the mating part by a union nut.

In a preferred embodiment the mating part is formed as a body of revolution in the area where it is connected to the holder. The fluid which is under high pressure is conducted to the holder through a channel in the mating part which is coaxial, for example. The fluid enters the channel structure in the fluidic component and leaves the fluidic component at the low pressure end thereof in the region of the base of the holder. The fluid pressure acts within the dead volume on the elastomeric shaped part.

The device according to the invention has the following advantages:

The tension within the elastomeric shaped part is spatially more uniformly distributed than the tension which may be produced in the known embodiment of the holder by an annular projection formed on the inside of the holder, underneath which the elastomeric shaped part is pushed during assembly.

The tension within the elastomeric shaped part may be adjusted, not only by the material properties of the shaped part itself, but by the ratio of the volume of the projection on the mating part to the volume which is absent from the tensionless elastomeric shaped part as a result of the chamfer.

The fluidic component is surrounded to its full height by the elastomeric shaped part which is under tension.

The device according to the invention is pressuretight in long-term use at fluctuating pressures with a large difference between the maximum pressure (40 Mpa or more) and the minimum pressure (about 0.1 Mpa).

The dead volume between the deformed elastomeric shaped part subjected to internal tension and the side of the mating part facing the holder can be kept small. It serves at the same time to equalise the tolerances when the holder is joined to the mating part.

The controlled deformation of the elastomeric shaped part during the joining of the holder to the mating part prevents the elastomeric shaped part from swelling out through the opening in the fluidic component.

The device according to the invention for clamping a fluidic component is used, for example, in a miniaturized high pressure atomizer (e.g., according to WO 91/12687), in a needle-less injector (e.g., according to WO 01/64268) or in an applicator for ophthalmologic, medicinal formulations (e.g., according to WO 03/002045). A medicinal fluid administered with a device of this kind may contain a pharmaceutical substance dissolved in a solvent. Suitable solvents include for example water, ethanol, or mixtures thereof. Examples of the pharmaceutical substances include berotec (fenoterol-hydrobromide, atrovent (ipratropium bromide), berodual (combination of fenoterol-hydrobromide and ipratropium bromide), salbutamol (or albuterol), 1-(3,5-dihydroxy-phenyl)-2-[[1-(4-hydroxy-benzyl)-ethyl]-amino]-ethanol-hydrobromide), combivent, oxivent (oxitropium-bromide), Ba 679 (tiotropium bromide), BEA 2180 (di-(2-thienyl)glycolic acid-tropenolester), flunisolide, budesonide and others. Examples may be found in WO 97/01329 or WO 98/27959.

DESCRIPTION OF THE INVENTION

The device according to the invention is explained more fully with reference to the Figures:

FIG. 1*a* shows in cross-section and diagonal elevation a pot-shaped holder (1) provided with a recess (2). An opening (3) is provided in the base of the holder.

FIG. 1*b* shows in cross-section and diagonal elevation an elastomeric shaped part (4) and a cuboid, fluidic component (5), which is made up of two parts and which has been inserted in the elastomeric shaped part. In the contact surface of the two parts a nozzle structure is provided which extends as far as the nozzle aperture (6). The top surface of the elastomeric shaped part (4) at the high pressure end stands in the annular region (7) perpendicular to the axis of the elastomeric shaped part. The chamfer (8) of the elastomeric shaped part begins on the top surface of the elastomeric shaped part and extends as far as the outer surface of the fluidic component.

FIG. 1*c* shows in cross section and in diagonal elevation a mating part (9) with a bore (10) and an annular projection (11) on its side facing the elastomeric shaped part.

FIGS. 3*a*, 4*a*, and 5*a* show the elastomeric shaped part viewed perpendicularly.

FIGS. 3*b*, 4*b*, and 5*b* show cross-sections through the elastomeric shaped part.

The elastomeric shaped part contains a cuboid recess (31) for a cuboid fluidic component. The cross-section in FIG. 3*b* runs along the line A-A in FIG. 3*a*; the line A-A runs perpendicularly to the longer side of the recess (31). The cross section in FIG. 4*b* runs along the line B-B in FIG. 4*a*; the line B-B runs perpendicularly to the shorter side of the recess (31). The cross section in FIG. 5*b* runs along the line C-C in FIG. 5*a*; the line C-C runs diagonally to the recess (31). The line of intersection (32) of the chamfer (8) with the recess (31) runs at a constant level. The angle of inclination (measured from the main axis of the component) of the chamfer (8) is at its greatest in FIG. 3*b* and at its smallest in FIG. 5*b* and in FIG. 4*b* the angle of inclination has an intermediate value.

Figure 6:
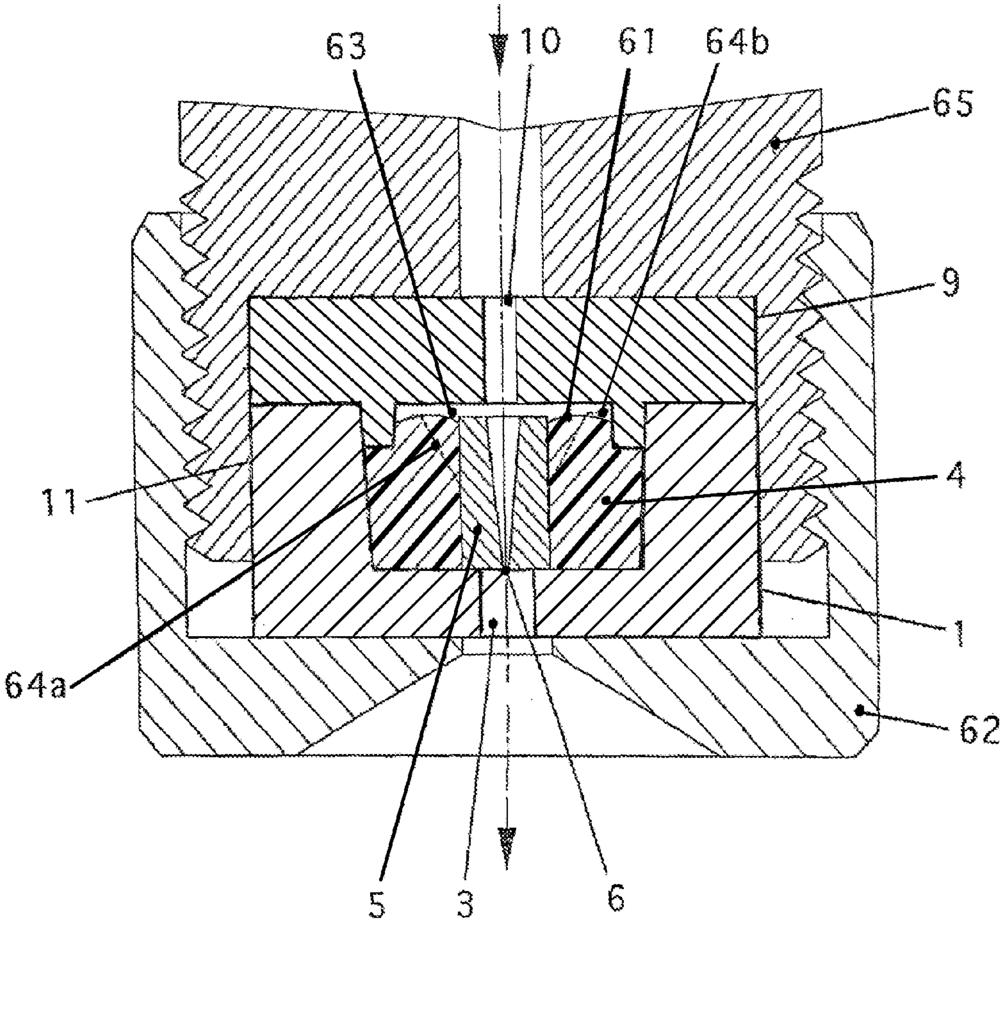

FIG. 6 shows a cross section through the assembled holder which is mounted on a container for a fluid. The holder (1) contains in its recess an elastomeric shaped part (4) with the fluidic component (5). A mating part (9) is located on the edge of the holder. The projection (11) on the mating part (9) projects into the recess in the holder (1) and has deformed the elastomeric shaped part (4). The side (61) of the elastomeric shaped part exposed to the fluid is convex, but the deformed elastomer does not extend right up to the nozzle structure in the fluidic component. The dotted lines (64*a*) and (64*b*) indicate the contour of the chamfered shaped part (4) before the assembly of the holder. The dead volume (63) serves to equalize the tolerances during the assembly of the holder; it has been reduced to the minimum. The holder is secured to the mating part (9) and to the housing (65) for the fluid by a union nut (62). The direction of flow of the fluid is indicated by arrows. The low pressure end of the holder is located in the surface which contains the nozzle aperture (6). The high pressure in the fluid acts in the channel structure within the fluidic component (5), within the dead volume (63), within the bore (10) in the mating part (9) and within the housing that contains the fluid.

FIGS. 7*a*, 7*b*, and 7*c* show the holder according to the invention in cross-hatched cross-section and FIGS. 8*a*, 8*b*, and 8*c* compare it with the embodiment in the cross-hatched cross section according to the prior art.

FIG. 7*a* shows a chamfered elastomeric shaped part (4*a*) with a fluidic component (5) inserted therein before the assembly of the holder according to the invention. The elastomeric shaped part is almost as high as the fluidic component at its outer edge but lower in the area of contact with the fluidic component at the recess. The elastomeric shaped part is still un-deformed and is not yet under internal tension. FIG. 7*b* shows the situation after the insertion of a ring (71), causing the elastomeric shaped part (4*b*) to be deformed and internal tension to be produced inside the elastomeric shaped part. The deformed elastomeric shaped part (4*b*) extends over the fluidic component as far as its upper edge. The convexity of the elastomeric shaped part scarcely projects beyond the height of the fluidic component. FIG. 7*c* shows the deformed elastomeric shaped part (4*c*) after the assembly of the holder. The inserted projection (11) has deformed the elastomeric shaped part (4*c*). A small dead volume (63) is present between the deformed elastomeric shaped part (4*c*) and the base of the mating part.

FIG. 8*a* shows a (non-chamfered) elastomeric shaped part (74*a*) with a fluidic component (5) inserted therein before the assembly of the holder according to the prior art. The elastomeric shaped part is lower than the fluidic component. The elastomeric shaped part is un-deformed and is not under internal tension. FIG. 8*b* shows the situation after the addition of a ring (71) which prevents the elastomeric shaped part (74*b*) from falling out of the holder or from sliding inside the holder but does not deform the elastomeric shaped part. FIG. 8*c* shows the un-deformed elastomeric shaped part (74*c*) after the assembly of the holder using a mating part (9), on which an annular projection (11) is provided. The dead volume (75) in FIG. 8*c* is larger than the dead volume (63) in FIG. 7*c*.

EXAMPLE

Mount for an Atomizer Nozzle of Miniature Construction

This device consists of a cylindrical holder made of steel with an external diameter of 6.0 mm and a height of 2.6 mm. It contains a truncated cone-shaped recess with an internal diameter of 4.0 mm at the base of the truncated cone. The base of the holder contains a bore 0.8 mm in diameter. The base of the holder is 0.4 mm thick in the vicinity of the bore.

The outer contour of the elastomeric shaped part made of silicon rubber is cylindrical. Before it is inserted in the holder the cylinder has a diameter of 4.2 mm and is 2.1 mm high on its outer surface. It contains a symmetrically arranged recess 1.3 mm wide and 2.8 mm long which passes axially through the elastomeric shaped part.

The elastomeric shaped part is chamfered towards the recess at its high pressure end. The chamfer begins in the cover surface of the cylinder over a circle with a diameter of 3.2 mm. The chamfer runs at different inclinations towards the rectangular recess to a constant depth of 0.7 mm at the line of intersection with the recess.

The fluidic component is constructed as an atomizer nozzle. The nozzle is a cuboid made up of two sheets of silicon and is 1.4 mm wide, 2.7 mm long, and 2.1 mm high. In the contact surface of the sheets the nozzle contains a recess which is provided with a micro-engineered filter and a micro-engineered evaporation device. On the side of the nozzle where the fluid leaves the nozzle, the recess merges into two channels each of which is 8 μm wide, 6 μm deep, and about 200 μm long. The axes of the two channels are located in one plane and are inclined at about 90 degrees to one another. The two nozzle apertures are spaced from one another by about 100 μm on the outside of the atomizer nozzle.

The essentially cylindrical mating part is provided with an annular projection on its side facing the holder. The projection has an external diameter of 3.15 mm, an internal diameter of 2.9 mm, and a constant height of 0.6 mm. The mating part contains an axial bore 0.4 mm in diameter.

The device is secured to the mating part by means of a union nut. The mating part is part of a container which contains the liquid to be atomized. The liquid is conveyed from the container to the atomizer nozzle by means of a miniaturized high pressure piston pump in amounts of about 15 microliters.

The peak value of the fluid pressure inside the atomizer nozzle is about 65 MPa (650 bar) and falls back to virtually normal air pressure (about 0.1 MPa) after the end of the atomization.

What is claimed is:

1. An apparatus, comprising:

a housing including a bore for delivering pressurized fluid;

a holder including an internal volume;

a mating element that engages the holder and covers the internal volume thereof, the mating element including: (i) a bore in fluid communication with the bore of the housing for delivering the pressurized fluid into the internal volume of the holder, and (ii) an annular projection that extends into the internal volume of the holder;

a nozzle including an outer contour and an internal, narrowing nozzle bore extending from a first end to a nozzle aperture at a second end through which an aerosol exits;

an annular elastomeric part surrounding the outer contour of the nozzle and being disposed in the internal volume of the holder such that: (i) the first end of the nozzle is in fluid communication with, and receives the pressurized fluid from, the bore of the mating element, and (ii) both the first end of the nozzle and an adjacent end surface of the annular elastomeric part are spaced away from the bore of the mating element, thereby defining an unoccupied volume within the internal volume of the holder, and exposing the end surface of the annular elastomeric part to the pressurized fluid; and a union member bearing against the holder and engaging the housing such that: (i) the mating element is pressed toward the holder, and (ii) the annular projection of the mating element deforms the annular elastomeric part at the first end of the nozzle.

2. The apparatus according to claim 1, wherein the annular projection of the mating element internally tensions the annular elastomeric part such that the internal tension is substantially uniformly distributed.

3. The apparatus of claim 1, wherein the annular elastomeric part includes an internal passage in which the nozzle is disposed such that the annular elastomeric part surrounds the outer contour of the nozzle.

4. The apparatus of claim 3, wherein the internal passage extends from the end surface of the annular elastomeric part to an opposite end thereof.

5. The apparatus of claim 4, wherein the internal passage includes a chamfer surface at the end surface of the annular elastomeric part that would not bear against the nozzle absent the deformation of the annular elastomeric part by the annular projection of the mating element.

6. The apparatus according to claim 5, wherein the chamfer surface is chamfered at a constant or varying angle of inclination at each point along the chamfer surface absent the deformation of the annular elastomeric part by the annular projection of the mating element.

7. The apparatus according to claim 5, wherein a line of intersection of the chamfer surface with the internal passage of the annular elastomeric part extends at a constant level or is curved.

8. The apparatus according to claim 1, wherein the annular projection on the mating element has a width and a height that are independently constant or varying along a length of the annular projection.

9. The apparatus according to claim 1, wherein the holder further includes: (i) an inside surface in contact with the second end of the nozzle, (ii) an inside contour that mates and/or aligns with an outside contour of the annular elastomeric part, and (iii) an annular end secured to the mating element.

* * * * *